Jan. 14, 1964 A. THOMAS 3,117,832
METHOD AND APPARATUS FOR BIOLOGICAL STERILIZATION
AND RELATED PROCESSES
Filed Feb. 7, 1961

3,117,832
METHOD AND APPARATUS FOR BIOLOGICAL
STERILIZATION AND RELATED PROCESSES
André Thomas, 8 rue Pierre Curie, Paris, France
Filed Feb. 7, 1961, Ser. No. 87,696
Claims priority, application France Feb. 9, 1960
5 Claims. (Cl. 21—58)

This invention relates to sterilization and disinfection of enclosures and/or objects contained in the enclosures. One usual way of sterilizing an object is to expose it to the action of heat until any pathogenic germs contained in or on the object are destroyed. There are however various materials which are liable to be damaged when thus treated even if care is exerted to make the application of heat as moderate as consistent with the requisite destruction of pathogenic life.

Accordingly, another method of sterilization or disinfection sometimes used is by treatment with chemical antiseptic or the like agents. However, in this case again there often is an incompatibility between the treating agent and the treated material.

Another method of sterilizing at ordinary temperature involves the use of physico-chemical agents such as irradiation with ultra-violet rays, exposure to ozone, or certain toxic gases. But these various means all have their serious drawbacks when it is required to produce a thorough biological sterilization. Thus ultra-violet rays inherently cannot achieve full sterilization in most cases owing to their insufficient depth of penetration, any germs that are not directly irradiated being masked or shaded escaping destruction. Ozone is not an effective destructive agent in regard to certain types of germs unless used under high concentration and for lengths of time that are not easily practicable in most cases. Poison gases such as ethylene oxide when used under high concentrations and for prolonged periods usually have a deleterious action on plastics in that they have a depolymerizing or dissolving effect. Thus ethylene oxide when used under comparatively high concentration and for a time long enough to produce an effective sterilizing, insecticidal, fungicidal or bactericidal action, damages or destroys various compositions, including polyvinyl base plastics. Similarly methyl bromide, hydrogen phosphide, hydrocyanic acid, cyanides and other toxic gases all require specialized equipment and drastic protection in use.

It is an object of this invention to provide an improved method of sterilization and/or disinfection which will be highly effective under ordinary conditions to destroy germs and other pests without damaging the materials to be sterilized or disinfected and without requiring difficult and expensive means of protection.

The invention is based on the finding that two or more conventional sterilizing agents, when used simultaneously or successively each in an amount well below its own threshold of effectiveness, are capable under conditions to be specified, to produce a combined or "synergistic" action that will result in a full destruction of the germs or other organisms to be destroyed, while being incapable of damaging the usual compositions of matter that are to be sterilized or disinfected.

The agents used according to the invention include toxic gases such as ethylene oxide, propylene oxide, or the like, ozone and radiations such as ultra-violet rays.

The invention further comprises sterilizing apparatus based on the above general method, which apparatus may comprise a sealed enclosure provided with two inlet and outlet means for gaseous agents, desirably associated with ultra-violet ray generating means, and an ozone generator associated with one of said gas inlets for controllably discharging an ozone-containing gas into the enclosure. The other above mentioned gas inlet serves for the injection simultaneously but preferably prior to an injection of ozone-containing gas, of a suitably selected sterilizing gas such as ethylene oxide. The ozone-containing gas is used preferably to flush the enclosure for cleansing it of the previously injected sterilizing gas. The discharge of ultra-violet rays into the enclosure may be effected as a supplement to the sterilizing action during or after the action of the afore-mentioned gases, but preferably concurrently therewith. The rate of irradiation with ultra-violet rays may be on the order, by way of example, of about 700 microwatts/sq. cm., at a wavelength of 2,537 A.

Among the various combinations of gaseous agents that are usable according to the method of the invention, particularly desirable combination which is used in the preferred form is ethylene oxide and ozone, discharged in that order and in amounts to be specified.

Thus, in an important aspect of the invention, the sterilizing or disinfecting method consists in successively producing a static discharge of ethylene oxide at a rate of about 0.1 gram per liter of enclosure space to be treated, at a pressure somewhat higher than atmospheric, and the enclosure being slightly humidified and maintained at a temperature of about 40° C.; then discharging a blast of ozone-containing oxygen at a concentration of from 12 to 18 milligrams ozone per liter of the mixture, and at a rate of 2 to 5 liters per minute and per 100 liters of enclosure space to be treated. The oxygen in the ozone-containing mixture may be replaced with air provided an equivalent ozone concentration is maintained in the mixture. Each of the two separate sterilizing steps thus described is preferably relatively short, e.g., about one half hour.

The essential advantage of the process described lies in the fact that, while the individual doses of ethylene oxide (or the like) and ozone used are per se quite insufficient to ensure adequate sterilization, and while the sum of the individual actions of said agents would, therefore, not ensure adequate sterilization, the successive application of the agents at the rates and in the order indicated, achieves a synergistic effect which does result in a full and thorough sterilization of the enclosure. It should be noted that the very character of the process is such as to enable ready sterilization or disinfection of large volumes of space such as large rooms in living and other premises, together with all furniture and other articles contained therein, without expensive equipment and without any danger of damage or necessity of expensive protective shielding.

In fact, ethylene oxide at the dose indication does not practically produce any alteration whatever in compositions of matter from which most man-made objects are made, including plastics such as polyvinyl chloride, whereas ethylene oxide when used at the concentration ordinarily applied for sterilizing and especially bactericidal purposes (e.g., from about 200 to 1000 grams per cubic meter and for several hours), is highly deleterious to man-made materials such as polyvinyl base synthetic resins.

In a similar connection it should be noted that while ethylene oxide above a predetermined threshold of concentration reacts more or less explosively with an oxygen-containing mixture, e.g., when the concentration exceeds about 3% ethylene oxide in air by volume, no similar dangerous reaction tends to occur under the conditions used in the method of the invention. Thus if the ethylene oxide concentration in the enclosure is initially on the order of say 5% by volume, there will be no danger whatever to discharge the blast of ozone containing gas into the sealed enclosure while the latter still contains, after the prescribed delay, a residual proportion of the specified lose of ethylene oxide, especially since the concentration thereof diminishes in the humid atmosphere, thus making it possible gradually to displace the ethylene oxide atmosphere by the delivery of the ozone-containing mixture itself, while the effluent gases from the enclosure are concurrently absorbed and destroyed. For this last purpose the blast of ozone-containing gas which gradually displaces the residual, low-concentration ethylene oxide, may desirably be bubbled through two washing units in succession, a first one containing sodium disulfide for destroying the ozone while the second may contain sodium carbonate for destroying the sulfur dioxide formed in the first washer. The residual ethylene oxide is thus absorbed in an acidic medium so that no toxic products are discharged into the atmosphere and no danger of explosion is present.

It is essential to observe that in any case the doses used for the respective agents, as specified above and discharged at the outlet from the enclosure, are practically harmless to the human organism.

An essential advantage of the invention is the fact that it does not require the use of any high pressure apparatus as required in current sterilizing methods using ethylene oxide, since the only superatmospheric pressure to which the enclosure may have to be subjected is the very moderate pressure resulting from the discharge, in the sealed enclosure, of the amount of ethylene oxide specified above, i.e., of about 100 gram per cubic meter.

At the same time, another advantage is the fact that the process does not involve the use of any vacuum equipment as is conventionally required before applying the ethylene oxide or after said application to ventilate or flush the enclosure with clean air.

Advantageously, the liquid ethylene oxide may be mixed with non-inflammable liquids having a vaporization temperature rather close to that of ethylene oxide (10.8° C.), whereby the ethylene oxide gas can be generated in dilute form in an inert and non-inflammable gas mixture. Among the liquefied gases usable in this way for admixture with the ethylene oxide, there may be mentioned the various Freons and methylene chloride for example. The proportion of ethylene oxide in the volatile mixture according to this feature of the invention may be 10 parts per 60 parts Freon for example, and such mixture may be conveniently stored in liquid form in sealed bottles provided with perforatable sealing caps whereby perforation of the cap will cause the liquid contents to escape in gaseous form at the temperature of the enclosure.

The sterilizing properties of ethylene oxide may if desired be enhanced or complemented by the admixture therewith of any other desired agents, such as insecticides, bactericides, and the like, e.g., methyl formiate, provided of course the volatilization temperature of such admixtured agents is not too remote from the temperature of 10° C., so that the liquid mixture will evaporate entirely after being warmed for a few minutes.

The ozone constituent in the process of the invention is used diluted in oxygen or air at a pressure not greatly differing from atmospheric pressure and substantially at the surrounding temperature; for this purpose a simple ozonizer installed near the enclosure may conveniently be used.

It is emphasized in this connection that prior to the invention, it has always been considered necessary that ozone alone, or ethylene oxide alone, should be used at comparatively high concentrations and for long periods if thorough sterilization was to be achieved, and even when thus used certain noxious organisms were resistant to each of said agents, even at the high concentrations employed. Moreover, ozone to be effective had to be used under certain special conditions which made its use difficult or uncertain for total microbic sterilization. As to ethylene oxide this had to be used under a high pressure of several atmospheres and for many hours, e.g., from 3 to 12 hours, and also at elevated temperatures from 54 to 65° C., and under predetermined conditions of humidity after first having produced a vacuum in the enclosure and flushing or ventilating the enclosure after the treatment with a blast of filtered air. The invention therefore rests on the finding that ethylene oxide and ozone when used in amounts considerably lower than were heretofore considered essential for efficient sterilization, combine their actions "synergistically" when used in the manner specified, to accomplish a full and complete bacteriological sterilization. Moreover, the ozone when used after the ethylene oxide results in a destruction of certain objectionable substances, e.g., pyrogenic substances generated by certain bacteria.

Some numerical data will now be given by way of example for illustrating the results obtainable by the process of the invention. It is well-known that certain germs such as *Bacillus subtilis* and various strains of Staphylococcus, are only destroyed by ethylene oxide gas when this is applied at concentrations of the order of from 500 to 750 milligrams per liter, and for times of from about 3 to about 7 hours. Similarly, certain (e.g., sporulated) germs, such as Enterobacteria, will withstand a continuous discharge of ozone-containing oxygen containing about 10 to 12 grams/liter ozone, for periods as high as 24 hours.

On the other hand, populations of *Bacillus subtilis*, Staphylococci, Enterobacteria, and/or other sterilization-resistant germs, in pure 24-hour culture, i.e., in extremely concentrated populations and hence under the most difficult sterilization conditions conceivable, or such germs contaminating various objects such as surgical instruments, when subjected to the sterilization process of the invention under the specific conditions to be specified presently, were completely and definitely destroyed as proved by the fact that no sub-cultures could be obtained after the primary cultures, after treatment, were re-seeded into their preferred culture media. This process according to the invention involved first, treatment with ethylene oxide at 100 mg./liter concentration in humid atmosphere at 40° C., for 30 minutes, followed by a continuous treatment with oxygen containing about 12 mg./liter ozone at a rate of 5 liters/minute for 30 minutes, with 2,537 A. ultra-violet irradiation at a rate of 700 microwatts per square centimeter, during both gaseous treatments.

It is again emphasized that each of the three agents viz. ethylene oxide, ozone, and ultra-violet irradiation, when used alone under similar conditions do not result in any substantial degree of sterilization.

A specific form of sterilizing apparatus usable in performing the method of the invention will be described by way of example but not of limitation with reference to the accompanying drawings, wherein:

FIG. 1 is a simplified perspective view of improved sterilizing apparatus;

FIG. 2 is a simplified fragmentary vertical section of a container for storing volatile toxic liquids prior to delivery in gas form into the enclosure of the apparatus of the invention;

FIG. 3 is a longitudinal sectional view of an accessory.

The form of the invention illustrated in the drawings comprises a small-size, portable apparatus including a sealable enclosure and attachments for sterilizing various articles and/or materials placed in the enclosure, by treatment with a first toxic gas such as ethylene oxide, followed by treatment with ozone and with concurrent ultra-violet irradiation. It is however to be understood that this embodiment is in no way restrictive since the teachings of the invention may be carried out in a great variety of other forms, such as for the sterilizing of large enclosures and premises, e.g., rooms in buildings, or large-sized enclosures for the conditioning of various products in bulk, grain silos, so-called fumigation, maturation, stimulation and refining chambers, and the like, without exceeding the scope of the invention.

Referring to the drawings, the sterilizing equipment shown includes two main sections: a sealable enclosure 1 and an ozone generator 2. The enclosure 1 may comprise as shown a frame 3 made from suitable alloy resisting the action of the gases used, of generally rectangular shape as shown. One side of the frame includes a door structure 4 which is adapted when closed to provide a gas-tight seal by means of suitable conventional sealing gaskets, not shown. The door is shown as mounted on the frame by the hinge 5 on one side and as having a lock mechanism 6 on the other side operable by a handle 7.

The lateral sides of the frame each comprise a wall 8 sealed to the frame, and which may be made of any suitable material such as metals, or transparent or translucent materials (as shown) provided it withstands corrosion by the gases used. Thus where the gases used are ethylene oxide and ozone, the walls of the enclosure may be at least internally formed from or lined with sheet glass or suitable polyamide such as nylon or Rilsan.

One of the side walls of the enclosure, e.g., as shown the side comprising the door 4, is provided with two openings sealed by means of flexible sleeve elements 9 desirably formed as gloves at their ends for allowing an operator to insert his forearms into the enclosure and handle the objects therein under sterile conditions, according to a per se well-known expedient.

Near the base of one side of the enclosure is a gas inlet valve 10 and near the top of an opposite wall of the enclosure is a gas outlet valve 11 (connectable to absorbing and/or washing equipment not shown for removing the deleterious effluent gases). Supported from the top wall within the enclosure is an ultra-violet generator 12 of suitable type and power rating, e.g., a mercury vapor quartz tube, or a bulb of the so-called germicide type. Certain types of ultra-violet generators available on the market are adapted to serve at the same time as ozone generators, and such units may if desired be used in this instance. An electric switch 13 is shown as positioned on the ozone generator section 2 of the apparatus (presently described) for controlling the operation of the ultraviolet generator 12. Various ancillary means for the control of the U-V generator unit such as the lamp contactors and regulators are positioned outside the enclosure (not shown). From the base of one side wall of the enclosure projects a union 21 for the inlet of the ozone-containing gas from the ozone generator unit 2.

The ozone generator unit 2 is shown as forming a base block on which the enclosure 1 is mounted, it being understood that this is a convenient but by no means an essential arrangement. The ozone generator unit is conventional and its internal construction will not be described. The unit 2 includes a plug connector 15 connectable with a suitable source of electric power, and a general control switch 14 is positioned on the front of the unit. An oxygen inlet valve 16 is provided on one side of the unit for connection by a hose 17 with an oxygen container 19 through a pressure-reducing valve provided with a gauge 18. The oxygen container 19 is preferably of the type made from a strong light alloy for reducing the over-all weight of the equipment. Projecting from a side of the unit directly below the ozone inlet 21 of the enclosure is an ozone outlet 20 which is connectable with inlet 21 by a connector 22 through which the ozone-containing gas mixture produced by the ozone generator unit 2 is directly discharged into the enclosure 1.

Oxygen from the container 19 at a suitable pressure and delivery rate is delivered into the ozone generator unit 2, through inlet 16 and is therein partly converted to ozone, and the resulting ozone-containing oxygen is passed into the enclosure 1 through the connection 20–21. Instead of the oxygen store 19, an air compressor may be used.

The unit 2 is shown provided with further accessories and controls including a knob 23 and dial for adjusting the rate of ozone formation, a timer switch 24 for automatically cutting off the power after a prescribed period of time and thus limit the time both of ozone production and ultra-violet irradiation, and a thermostatically regulated heating means (not shown) for heating the enclosure to a prescribed moderate temperature, e.g., 40° C. Suitable degree of humidity may be maintained in the enclosure by the simple expedient of providing a small water tank, not shown, placed on the bottom of the enclosure.

The sterilizing gas or gases, such as ethylene oxide, delivered into the enclosure through inlet 10 and discharged therefrom through outlet 11, may conveniently be stored and handled in the following way. Considering for example ethylene oxide, a store of this compound may be contained in liquid form in a number of pressure-resistant glass phials such as the phial 25 shown in FIG. 2, tightly sealed by a closure assembly impervious to ethylene oxide. The closure may comprise, as shown, a sealing disc 26 of polyamid sheet material for example, retained by an overlying cap 27 crimped about the neck of the bottle 25. The ethylene oxide distributed in metered amounts in the set of phials or bottles 27 can thus be stored at ambient temperature, with or without addition of some protective inert gas such as carbon dioxide, nitrogen, Freons, methylene chloride, or the like, adapted to prevent inflammability of the ethylene oxide on contact with air.

In use, the seal of a phial such as 25 may be simply perforated with the sharp end of a canula-like member such as 28 (FIG. 3) terminating at its other end in an olive-like enlargement 29, connectable with a tube 30, adapted to be connected with the inlet 10 of the enclosure. When the seal is thus perforated the ethylene oxide liquid or other liquid mixture in the phial will be vaporized; if desired, vaporization may be somewhat accelerated by moderately heating the phial as by immersing it in a hot water bath or other means, it being noted that the boiling point of ethylene oxide at ordinary pressure is only 10.8° C.

It will be understood that larger-capacity models of sterilizing apparatus according to the invention might be provided with multiple ozone generators and ultra-violet generators and more elaborate means for delivering gases through the enclosure and controls for regulating the various sterilizing conditions.

What I claim is:

1. A method of sterilizing the contents of an enclosure which consists in producing in the enclosure a static discharge of a quantity of ethylene oxide at the approximate rate of 0.1 gram per liter of enclosure space to be sterilized, at a pressure slightly exceeding atmospheric pressure, and introducing into the enclosure ozone-containing gas in which the gas is selected from the group consisting of oxygen and air, starting not earlier than the start of the discharge of the ethylene oxide and not later than immediately after the end of the discharge of the ethylene oxide, said ozone-containing gas being in equivalent proportions of 12–18 milligrams ozone per liter and being introduced at a rate of 5 liters per minute to 2 liters per minute per about 100 liters of enclosure space to be sterilized.

2. The method according to claim 1, wherein ethylene oxide and ozone-containing gas are allowed to act for approximately 30 minutes in each of the two phases of the treatment.

3. The method according to claim 1, wherein in addition to ethylene oxide and ozone-containing gas, an ultraviolet irradiation is applied within the enclosure.

4. The method according to claim 1, wherein in addition to ethylene oxide and the ozone-containing gas, ultraviolet irradiation is applied within the enclosure, said irradiation being of the order of 700 microwatts per square centimeter, having a wave-length of 2,537 A.

5. The method according to claim 1, wherein ethylene oxide is delivered into the enclosure by evaporation from a liquid mixture containing about 10 parts ethylene oxide for 60 parts inert liquid.

References Cited in the file of this patent

UNITED STATES PATENTS

| | | |
|---|---|---|
| 2,490,344 | Fisher | Dec. 6, 1949 |
| 2,537,530 | Hofman | Jan. 9, 1951 |
| 2,899,266 | Gewalt et al. | Aug. 11, 1959 |
| 2,938,766 | Hall | May 31, 1960 |

OTHER REFERENCES

Smolens et al.: Combined Use of Ultraviolet Irradiation and Beta Propolactone Sterilization of Sera Infected with a Virus; Proc. of the Soc. for Exptl. Biol. and Med., July 1954, pages 538–539.

Reddish: Antiseptics, Disinfectants, Fungicides and Chemical and Physical Sterilizations; 2nd ed., Phila., 1957, pages 759, 761–762.